US012810393B2

(12) United States Patent
Kokura

(10) Patent No.: US 12,810,393 B2
(45) Date of Patent: Nov. 24, 2026

(54) IMAGE PROCESSING APPARATUS, IMAGE PROCESSING SYSTEM, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Toru Kokura, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 208 days.

(21) Appl. No.: 18/798,073

(22) Filed: Aug. 8, 2024

(65) Prior Publication Data

US 2025/0069197 A1 Feb. 27, 2025

(30) Foreign Application Priority Data

Aug. 24, 2023 (JP) ................................ 2023-136528
Mar. 12, 2024 (JP) ................................ 2024-038415

(51) Int. Cl.

| | |
|---|---|
| ***G06K 9/00*** | (2022.01) |
| ***G06T 5/60*** | (2024.01) |
| ***G06T 5/70*** | (2024.01) |
| ***G06T 7/00*** | (2017.01) |
| ***G06T 7/90*** | (2017.01) |
| *H04N 9/64* | (2023.01) |

(52) U.S. Cl.
CPC .................. *G06T 5/60* (2024.01); *G06T 5/70* (2024.01); *G06T 7/0002* (2013.01); *G06T 7/90* (2017.01); *G06T 2207/10024* (2013.01); *G06T 2207/20081* (2013.01); *G06T 2207/20084* (2013.01); *G06T 2207/30168* (2013.01); *H04N 9/64* (2013.01)

(58) Field of Classification Search
CPC . G06T 2207/10024; G06T 2207/20081; G06T 2207/20084; G06T 2207/30168; G06T 5/60; G06T 5/70; G06T 7/0002; G06T 7/90; H04N 9/64; H04N 9/646
See application file for complete search history.

(56) References Cited

U.S. PATENT DOCUMENTS 8,115,834 B2 * 2/2012 Suzuki .................. H04N 9/646 348/241
2010/0271505 A1 * 10/2010 Zimmer ................ H04N 23/60 348/222.1

(Continued)

FOREIGN PATENT DOCUMENTS

JP 5653098 B2 1/2015

OTHER PUBLICATIONS

Brooks, Tim, et al. "Unprocessing images for learned raw denoising." Proceedings of the IEEE/CVF conference on computer vision and pattern recognition. 2019. (Year: 2019).*

(Continued)

*Primary Examiner* — Hadi Akhavannik
(74) *Attorney, Agent, or Firm* — Venable LLP

(57) ABSTRACT

An image processing apparatus comprises an acquisition unit configured to acquire a first image generated by applying development processing to a RAW image, and an estimation unit configured to convert the first image into a second image that is an image in a color space independent of a developing method and estimate a noise intensity based on the second image.

17 Claims, 11 Drawing Sheets

(56) References Cited

U.S. PATENT DOCUMENTS

| | | | | |
|---|---|---|---|---|
| 2015/0235612 | A1* | 8/2015 | Okumura | H04N 9/69 345/589 |
| 2015/0358646 | A1* | 12/2015 | Mertens | H04N 19/186 382/166 |
| 2019/0114750 | A1* | 4/2019 | Guérin | H04N 23/85 |
| 2020/0074601 | A1* | 3/2020 | Tajbakhsh | G06T 5/92 |
| 2023/0336887 | A1* | 10/2023 | Hua | H04N 25/611 |
| 2024/0144432 | A1 | 5/2024 | Kokura | |
| 2024/0193732 | A1 | 6/2024 | Otani | |

OTHER PUBLICATIONS

"FastDVDnet: Towards Real-Time Deep Video Denoising Without Flow Estimation Matias Tassano etc."

Matias Tassano, et al., "FastDVDnet: Towards Real-Time Deep Video Denoising Without Flow Estimation," Computer Vision Foundation, 2020, pp. 1354-1363.

* cited by examiner

1001

NOISE INTENSITY:LOW
IMAGE PROCESSING INTENSITY:LOW
CALCULATION COMPLEXITY:TAP SIZE 4×4

1002

NOISE INTENSITY:MEDIUM
IMAGE PROCESSING INTENSITY:MEDIUM
COMPLEXITY:TAP SIZE 6×6

1003

IMAGE PROCESSING APPARATUS, IMAGE PROCESSING SYSTEM, IMAGE PROCESSING METHOD, AND NON-TRANSITORY COMPUTER-READABLE STORAGE MEDIUM

BACKGROUND OF THE INVENTION

Field of the Invention

The present invention relates to a technique of estimating an intensity of noise in an image.

Description of the Related Art

Recently, demands to apply image processing such as object detection, image quality improvement, or region segmentation in real time to an image or a moving image captured by a camera are increasing. Many of such image processing methods have achieved remarkable performance improvement by using a neural network. Since a recent neural network includes many layers, an enormous amount of computer resources is needed. It is difficult to provide all of these in the camera. Hence, a device configuration is often used, in which an image from a camera is transmitted to an external edge device provided with richer computer resources, and image processing using a neural network is performed in the edge device.

If the ambient illuminance lowers, or the shutter speed increases depending on the time or condition of image capturing, the number of photons entering each pixel decreases. For this reason, an image having a low S/N ratio and containing a strong noise component is obtained. With a condition under which an image with a high noise intensity is obtained, it is preferable to switch an image processing algorithm or a neural network model to one that is robust to noise or apply image quality improvement processing for removing noise. In contrast, with a condition under which the noise intensity is low, it is preferable to switch the neural network model to a light one dedicated to low noise or turn off noise removal processing to improve throughput or reduce hardware load.

To implement the above-described switch processing, it is necessary to estimate, based on an image received from a camera, the intensity of noise included in the image in the edge device. For example, FastDVDnet: Towards Real-Time Deep Video Denoising Without Flow Estimation discloses a technique of calculating a noise intensity by calculating the variation of pixel values.

In general, a camera converts, by development processing, a RAW image having a pixel value array obtained by receiving light by a sensor into an image suitable viewing by a human and outputs the image. In the development processing, the variation amount of pixel values is amplified or attenuated on a color or texture basis. In addition, the variation width can change for each developing method. For this reason, if the edge device receives such a developed image and applies a method disclosed in Japanese Patent No. 05653098, overestimation or underestimation of the noise intensity may occur.

SUMMARY OF THE INVENTION

The present invention provides a technique for suppressing overestimation or underestimation of the intensity of noise in an image.

According to the first aspect of the present disclosure, there is provided an image processing apparatus comprising: an acquisition unit configured to acquire a first image generated by applying development processing to a RAW image; and an estimation unit configured to convert the first image into a second image that is an image in a color space independent of a developing method and estimate a noise intensity based on the second image.

According to the second aspect of the present disclosure, there is provided an image processing apparatus comprising: an acquisition unit configured to acquire a first image generated by applying image conversion to a RAW image; and an estimation unit configured to decide a calculation complexity based on an image processing intensity in the image conversion, estimate a noise intensity based on the calculation complexity, and calculate the image processing intensity based on the noise intensity.

According to the third aspect of the present disclosure, there is provided a n image processing system comprising a first apparatus and a second apparatus, the first apparatus comprising: an acquisition unit configured to acquire a development result image generated by applying development processing to a RAW image; an estimation unit configured to estimate a noise intensity in the RAW image; and a transmission unit configured to transmit the development result image and the noise intensity to the second apparatus, and the second apparatus comprising: a reception unit configured to receive the development result image and the noise intensity transmitted by the transmission unit; and a control unit configured to perform execution control of image processing based on the development result image received by the reception unit in accordance with the noise intensity received by the reception unit.

According to the fourth aspect of the present disclosure, there is provided an image processing method performed by an image processing apparatus, comprising: acquiring a first image generated by applying development processing to a RAW image; and converting the first image into a second image that is an image in a color space independent of a developing method and estimating a noise intensity based on the second image.

According to the fifth aspect of the present disclosure, there is provided a non-transitory computer-readable storage medium storing a computer program configured to cause a computer to function as: an acquisition unit configured to acquire a first image generated by applying development processing to a RAW image; and an estimation unit configured to convert the first image into a second image that is an image in a color space independent of a developing method and estimate a noise intensity based on the second image.

Further features of the present invention will become apparent from the following description of exemplary embodiments with reference to the attached drawings.

DESCRIPTION OF THE EMBODIMENTS

Figure 1:
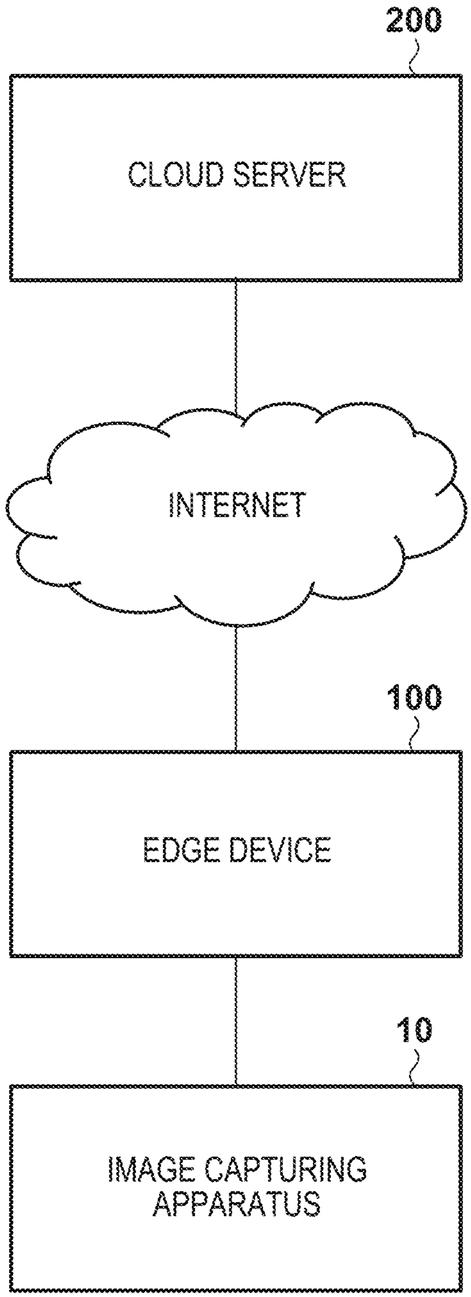
FIG. 1 is a block diagram showing an example of the configuration of an image processing system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<CNN>

A convolutional neural network (CNN) used in general information processing techniques using deep learning, which is used in the following embodiments, will be described first. The CNN is a technique of repetitively convoluting a filter generated by training or learning in an image and then performing a nonlinear operation. The filter is also called a local receptive field. An image obtained by convoluting a filter in an image and then performing a nonlinear operation is called a feature map. Also, learning is performed using learning data (training images or data sets) formed by a pair of an input image and an output image. Simply, learning is generating the value of a filter capable of accurately converting an input image to a corresponding output image from leaning data. Details will be described later.

If an image has RGB color channels, or a feature map is formed by a plurality of images, the filter used for convolution has a plurality of channels in accordance with this. That is, the convolution filter is expressed by a four-dimensional array including not only vertical and horizontal sizes and the number of filters but also the number of channels.

Processing of performing a nonlinear operation after a filter is convoluted in an image (or a feature map) is expressed using a unit called a layer and, for example, expressions such as "a feature map of the nth layer" and "a filter the of nth layer" are used. For example, a CNN that repeats filter convolution and the nonlinear operation three times has a 3-layer network structure. The nonlinear operation processing can be formulated by $$X_n^{(l)} = f\left(\sum_{n=1}^{N} W_n^{(l)} * X_{n-1}^{(l)} + b_n^{(l)}\right) \quad (1)$$

In equation (1), Wn is the filter of the nth layer, bn is the bias of the nth layer, f is the nonlinear operator, Xn is the feature map of the nth layer, and * is the convolution operator. Note that (1) on the upper right side of each variable represents that the variable indicates the lth filter/feature map. The filter and the bias are generated by learning to be described later and are collectively referred to a "network parameter". In the nonlinear operation, for example, a sigmoid function or Rectified Linear Unit (ReLU) is used. In a case of ReLU, the following expression is used.

$$f(X) = \begin{cases} X & \text{if } 0 \le X \\ 0 & \text{otherwise} \end{cases} \quad (2)$$

As indicated by equation (2), negative elements of an input vector X change to zero, and positive elements remain unchanged. As networks using the CNN, ResNet in the image recognition field and RED-Net that is an application in the noise removing field are famous. In these networks, a CNN having a multilayered structure is used to perform filter convolution many times, thereby increasing the accuracy of processing. For example, the ResNet has a network structure including a path to short-cut a convolutional layer, and thus implements a multilayer network with 152 layers and implements accurate recognition close to the recognition ratio of human. Note that processing accuracy can be improved by the multilayer CNN simply because a nonlinear relationship between input and output can be expressed by repeating the nonlinear operation many times.

<Learning of CNN>

Learning of the CNN will be described next. Learning of the CNN is performed by minimizing a target function generally expressed by equation (3) below for learning data formed by a set of an input learning image (student image) and an output learning image (supervisory image) corresponding to the input learning image.

$$L(\theta) = \frac{1}{n}\sum_{i=1}^{n} \|F(X_i; \theta) - Y_i\|^2 \quad (3)$$

In equation (3), L is a loss function for measuring an error between a correct answer and an estimation thereof, Yi is the ith output learning image, Xi is the ith input learning image, F is a function collectively representing equation (1) that is an operation performed in each layer of the CNN, θ is the network parameter (the filter and the bias), $\|Z\|_2$ is the L2 norm which, putting it simply, represents the square root of the square sum of the element of a vector Z, and n is the total number of learning data used for learning. In general, since the total number of learning data is large, some of the learning data are selected at random and used for learning in the stochastic gradient descent (SGD). This can reduce a calculation load in learning using many learning data. As a method of minimizing (=optimizing) the target function, various methods such as the momentum method, the AdaGrad method, the AdaDelta method, and the Adam method are known. The Adam method is given by $$g = \frac{\partial L}{\partial \theta_i^t} \quad (4)$$

-continued $$m = \beta_1 m + (1 - \beta_1) g$$

$$v = \beta_2 v + (1 - \beta_2) g^2$$

$$\theta_i^{t+l} = \theta_i^t - \alpha \frac{\sqrt{1 - \beta_2^t}}{(1 - \beta_1)} \frac{m}{(\sqrt{v} + \varepsilon)}$$

In equation (4), $\theta_i^t$ is the ith network parameter in the tth iteration, and g is the gradient of the loss function L concerning $\theta_i^t$. In addition, m and v are moment vectors, α is the base learning rate, β1 and β2 are hyper parameters, and ε is a small constant. Note that any method can be used basically because there is no guidance for selecting the optimization method in learning, but it is known that the learning time changes because of the difference in convergence between the methods.

First Embodiment

In this embodiment, using an example in which noise removal processing is performed as image processing using a CNN, an example in which a noise intensity that is an index to switch execution/nonexecution of noise removal is estimated will be described.

First, an example of the configuration of the image processing system according to this embodiment will be described with reference to the block diagram of FIG. 1. As shown in FIG. 1, the image processing system according to this embodiment includes a cloud server 200, an edge device 100, and an image capturing apparatus 10. The cloud server 200 and the edge device 100 are configured to be able to perform data communication with each other via the Internet. The edge device 100 and the image capturing apparatus 10 are configured to be able to perform data communication with each other via a wired and/or wireless network.

Note that the network configuration between the cloud server 200 and the edge device 100 is not limited to a specific network configuration. For example, the cloud server 200 and the edge device 100 may be connected by a LAN, or the cloud server 200 and the edge device 100 may be connected via two or more types of networks. The network can be wireless or wired, or a combination of these is also possible. Similarly, the network configuration between the edge device 100 and the image capturing apparatus 10 is not limited to a specific network configuration.

The cloud server 200 will be described first. The cloud server 200 generates learning data for "noise removal processing that is processing for removing noise in an input image". The cloud server 200 performs learning processing of a CNN using the generated learning data and updates the network parameter of the CNN, thereby generating the CNN having the updated network parameter as a learned model.

The edge device 100 will be described next. The edge device 100 acquires "an image generated by applying development processing to a RAW image" as an input image from the image capturing apparatus 10. The edge device 100 then performs inverse conversion of the development processing for the input image to generate a conversion result image, and estimates the intensity of noise (noise intensity) in the conversion result image. If the noise intensity is equal to or larger than a threshold, the edge device 100 performs noise removal processing for the conversion result image using the learned model acquired from the cloud server 200, and outputs an image obtained by the noise removal processing as an output image. For example, a user applies noise removal processing to an image using an image processing application installed in the edge device 100. On the other hand, if the noise intensity is smaller than the threshold, the edge device 100 outputs the conversion result image as an output image without performing noise removal processing.

The image capturing apparatus 10 will be described next. The image capturing apparatus 10 may be an image capturing apparatus that captures a moving image, or may be an image capturing apparatus that periodically or non-periodically captures a still image.

If the image capturing apparatus 10 is an image capturing apparatus that captures a moving image, the image capturing apparatus 10 applies development processing to the RAW image of each frame of a moving image, and outputs the image of the frame to which the development processing is applied as an input image to the edge device 100.

If the image capturing apparatus 10 is an image capturing apparatus that periodically or non-periodically captures a still image, the image capturing apparatus 10 applies development processing to the still image (RAW image) and outputs an image obtained by the development processing as an input image to the edge device 100.

Figure 2:
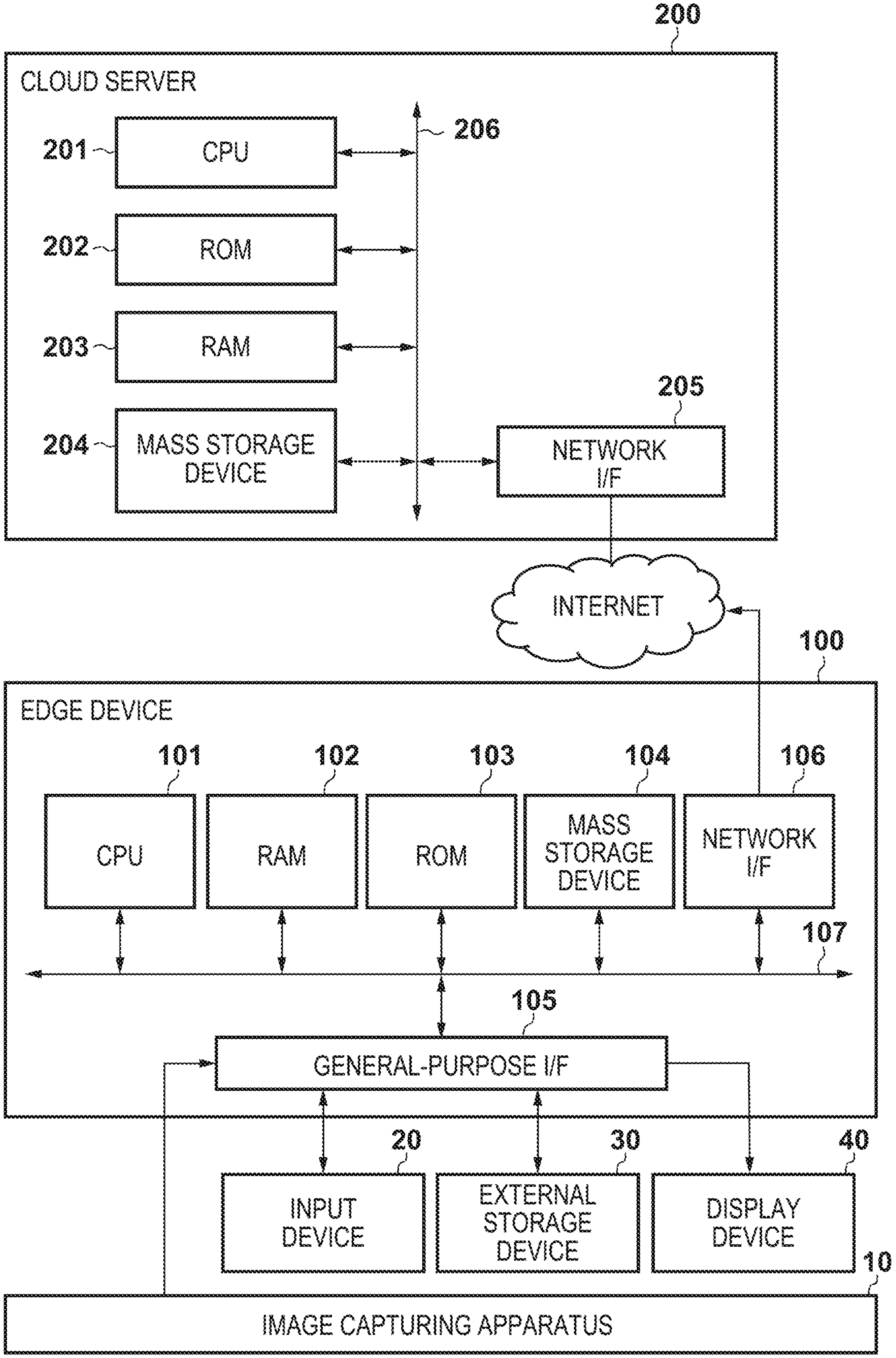
FIG. 2 is a block diagram showing an example of the configuration of the hardware of the image processing system.

An example of the hardware configuration of the image processing system according to this embodiment will be described next with reference to the block diagram of FIG. 2. First, an example of the hardware configuration of the edge device 100 will be described.

A CPU 101 executes various kinds of processing using computer programs and data stored in a RAM 102. The CPU 101 thus controls the operation of the entire edge device 100, and executes or controls various kinds of processing to be explained as processing to be performed by the edge device 100.

The RAM 102 includes an area configured to store computer programs and data loaded from a ROM 103, a mass storage device 104, or an external storage device 30. The RAM 102 further includes an area configured to store various kinds of data received from the cloud server 200 via a network I/F 106, and an area configured to store an image output from the image capturing apparatus 10. The RAM 102 also includes a work area used when the CPU 101 executes various kinds of processing. Thus, the RAM 102 can appropriately provide various kinds of areas.

In the ROM 103, setting data of the edge device 100, computer programs and data associated with activation of the edge device 100, computer programs and data associated with the basic operation of the edge device 100, and the like are stored.

The mass storage device 104 is a secondary storage device with a large capacity such as an HDD or an SSD. In the mass storage device 104, an operating system (OS), computer programs and data used to cause the CPU 101 to execute or control various kinds of processing to be explained as processing to be performed by the edge device 100, and the like are stored. The computer programs stored in the mass storage device 104 can include the computer program of the above-described image processing application. The computer programs and data stored in the mass storage device 104 are appropriately loaded into the RAM 102 in accordance with the control of the CPU 101 and processed by the CPU 101.

The network I/F 106 is a communication interface used to perform data communication with the cloud server 200 via the Internet. For example, the edge device 100 accesses the cloud server 200 via a web browser installed in the edge device 100 in advance, and acquires a learned model.

A general-purpose I/F 105 is a serial bus interface such as a USB, IEEE 1394, or HDMI®. The edge device 100 acquires computer programs and data from the external storage device 30 (for example, various kinds of storage media such as a memory card, a CF card, an SD card, and a USB memory) via the general-purpose I/F 105. In addition, the edge device 100 accepts a user instruction or information from an input device 20 via the general-purpose I/F 105. The input device 20 is a user interface such as a keyboard, a mouse, or a touch panel screen, and the user can input various kinds of instructions or information to the edge device 100 by operating the input device 20. Also, the edge device 100 outputs a processing result (an image, characters, or the like) by the CPU 101 to a display device 40 via the general-purpose I/F 105. The display device 40 can thus display the processing result by the edge device 100 as an image, characters, or the like. Note that the display device 40 may be a device including a liquid crystal screen or a touch panel screen, or may be a projection device such as a projector that projects an image or characters. Also, the edge device 100 acquires an image from the image capturing apparatus 10 via the general-purpose I/F 105. All the CPU 101, the RAM 102, the ROM 103, the mass storage device 104, the network I/F 106, and the general-purpose I/F 105 are connected to a system bus 107.

An example of the hardware configuration of the cloud server 200 will be described next. The cloud server 200 is an image processing apparatus that provides a cloud service on the Internet. The cloud server 200 generates and holds a learned model, as described above, and provides the learned model to the edge device 100 in accordance with a request from the edge device 100.

A CPU 201 executes various kinds of processing using computer programs and data stored in a RAM 203. The CPU 201 thus controls the operation of the entire cloud server 200, and executes or controls various kinds of processing to be explained as processing to be performed by the cloud server 200.

In a ROM 202, setting data of the cloud server 200, computer programs and data associated with activation of the cloud server 200, computer programs and data associated with the basic operation of the cloud server 200, and the like are stored.

The RAM 203 includes an area configured to store computer programs and data loaded from the ROM 202 or a mass storage device 204, and a work area used when the CPU 201 executes various kinds of processing. The RAM 203 also includes an area configured to store computer programs and data transmitted from the edge device 100 via a network I/F 205. Thus, the RAM 203 can appropriately provide various kinds of areas.

The mass storage device 204 is a secondary storage device with a large capacity such as an HDD or an SSD. In the mass storage device 204, an operating system (OS), computer programs and data used to cause the CPU 201 to execute or control various kinds of processing to be explained as processing to be performed by the cloud server 200, and the like are stored. The computer programs and data stored in the mass storage device 204 are appropriately loaded into the RAM 203 in accordance with the control of the CPU 201 and processed by the CPU 201.

The network I/F 205 is a communication interface used to perform data communication with the edge device 100 via the Internet. For example, the cloud server 200 provides a learned model to the edge device 100 in accordance with a request from the web browser operating in the edge device 100. All the CPU 201, the ROM 202, the RAM 203, the mass storage device 204, and the network I/F 205 are connected to a system bus 206.

Note that the hardware configuration of the edge device 100 shown in FIG. 1 is merely an example, and can appropriately be modified/changed. Similarly, the hardware configuration of the cloud server 200 shown in FIG. 1 is merely an example, and can appropriately be modified/changed.

For example, the cloud server 200 may be implemented using one computer apparatus, or may be implemented using two or more computer apparatuses. If the cloud server 200 is implemented using two or more computer apparatuses, learning data may be generated by one computer apparatus, and a learned model may be generated (learned) by the other computer apparatus.

In FIG. 1, one edge device 100 is connected to the cloud server 200. However, two or more edge devices 100 may be connected to the cloud server 200.

Also, for example, in FIG. 1, the image capturing apparatus 10 and the edge device 100 are separate apparatuses, but the image capturing apparatus 10 and the edge device 100 may be integrated to form one image capturing apparatus. In this case, the one image capturing apparatus has the function of the edge device 100 in addition to the image capturing function.

Also, for example, in FIG. 1, the cloud server 200 and the edge device 100 are separate apparatuses, but the cloud server 200 and the edge device 100 may be integrated to form one apparatus.

Also, for example, in FIG. 1, the cloud server 200, the edge device 100, and the image capturing apparatus 10 are separate apparatuses, but the cloud server 200, the edge device 100, and the image capturing apparatus 10 may be integrated to form one apparatus.

A problem that occurs when, using a technique represented by Japanese Patent No. 05653098, applying noise intensity estimation to a developed image that is an image obtained by applying development processing to a RAW image captured by the image capturing apparatus, and an approach as a countermeasure to the problem will be described next.

Figure 5:
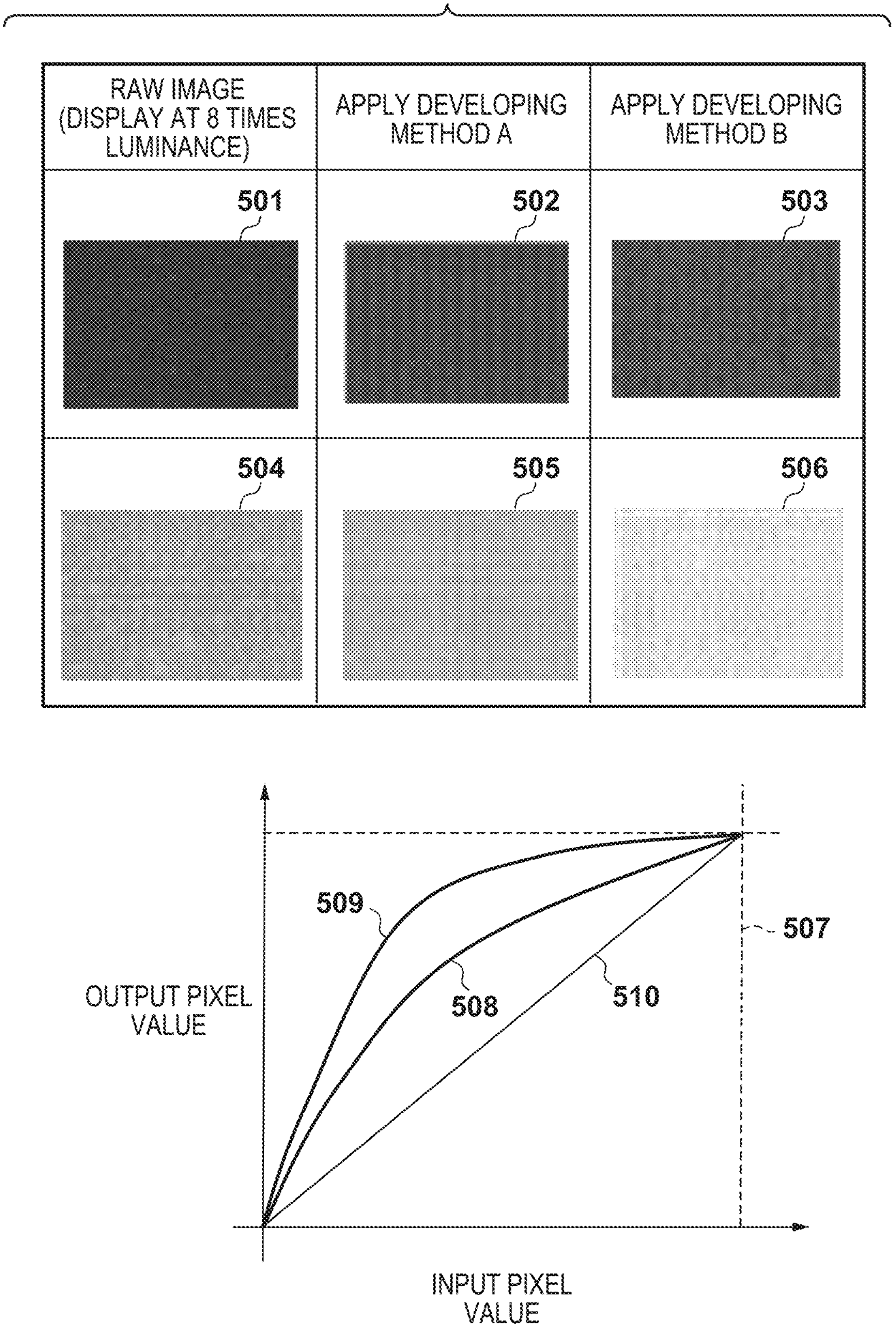
FIG. 5 is a view showing an example of a RAW image obtained by an image sensor provided in an image capturing apparatus.

FIG. 5 shows an example of a RAW image obtained by an image sensor provided in the image capturing apparatus. A patch 501 is an achromatic color portion that is an achromatic image region in the RAW image, and a patch 504 is a chromatic color portion that is a chromatic image region in the RAW image. The RAW image is a color filter array image with a linear luminance. To convert this image into an image suitable viewing by a human, development processing of interpolating missing channel information or converting luminance is applied in the image capturing apparatus. In the luminance conversion, as indicated by a graph 507, nonlinear conversion is performed for pixel values (input pixel values) in an input image, thereby obtaining pixel values (output pixel values) in an output image. As a result, as compared to a line 510 representing "the relationship between an input pixel value and an output pixel value" in a case where the nonlinear conversion is not performed, pixel values in a dark portion are large in curves 508 and 509 representing "the relationship between an input pixel value and an output pixel value" in a case where the nonlinear conversion is performed. These curves are called gamma curves. Other examples of typical processes constituting the development processing are OB correction, white balance (WB) correction, color matrix application, and gain application.

Since a preferable developing method changes depending on a scene, a development device is often designed to allow a user to do switching by selecting the developing method from a plurality of candidates. For example, to improve the visibility of a low luminance portion, a steep gamma curve like the curve 509 is suitable. If the patches 501 and 504 are developed by a developing method B using the gamma curve, patches 503 and 506 are obtained. On the other hand, to maintain the tone expression of all luminances, a gentle gamma curve like the curve 508 is suitable. If the patches 501 and 504 are developed by a developing method A using the gamma curve, patches 502 and 505 are obtained.

In the developing method A, a variation of pixel values can be confirmed in both the achromatic color portion and the chromatic color portion, like the RAW image. On the other hand, in the developing method B, a variation of pixel values can be confirmed in the achromatic color portion, but the variation is excessively small in the chromatic color portion because of the influence of the gamma curve that compresses a high luminance portion. In this case, if the method of Japanese Patent No. 05653098 is used, the noise intensity in the image may be underestimated due to the influence of the patch 506.

To this problem, in this embodiment, the noise intensity is estimated after the influence of development is removed by converting the image in the color space after development into the color space of the RAW image. Conversion of the color space is implemented by performing inverse conversion of development processing based on development parameters such as the gamma curve at the time of development processing, an OB value representing the zero point of the RAW image, a color filter array representing the arrangement of color filters of each pixel, a WB coefficient representing the ratio of the transmittance of each color of the color filter, a color matrix that is a matrix for performing color conversion to improve the viewing property, and a gain value that is a coefficient for multiplying a received pixel value by a uniform value.

Figure 3:
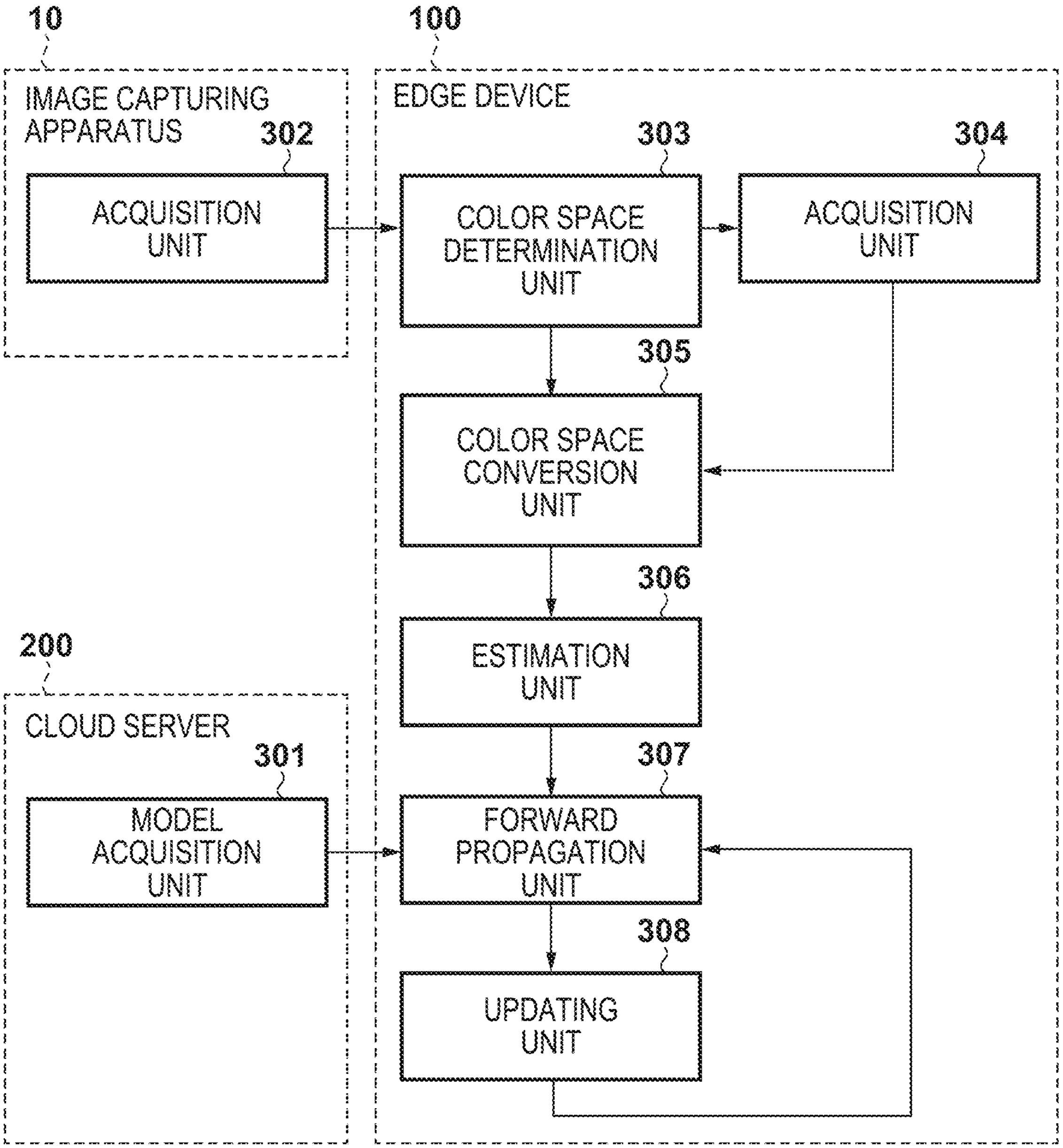
FIG. 3 is a block diagram showing an example of the functional configuration of the image processing system.

The block diagram of FIG. 3 shows an example of the functional configuration of the image processing system according to this embodiment. In this embodiment, a case where the function units of the cloud server 200 and the function unit of the edge device 100 shown in FIG. 3 are implemented by computer programs will be described. Also, in this embodiment, the function units of the cloud server 200 and the function unit of the edge device 100 shown in FIG. 3 will be described as the main constituent of processing. In fact, the CPU 201 executes a computer program corresponding to each function unit of the cloud server 200, thereby implementing the function of the function unit. Similarly, the CPU 101 executes a computer program corresponding to each function unit of the edge device 100, thereby implementing the function of the function unit. Note that one or more function units shown in FIG. 3 may be implemented by hardware. An acquisition unit 302 that is a function unit of the image capturing apparatus 10 is implemented by hardware including an optical lens, a circuit that drives and controls the optical lens, an image sensor, a circuit that performs various kinds of image processing including development processing, and the like.

Note that the configuration shown in FIG. 3 can appropriately be modified or changed. For example, one function unit may be divided into a plurality of function units, or two or more function units may be integrated into one function unit. The configuration shown in FIG. 2 may be implemented by two or more apparatuses. In this case, the apparatuses are connected via a circuit or a wired or wireless network and perform cooperative operations by performing data communication with each other, thereby implementing each processing to be described later. The operation of the image processing apparatus according to this embodiment will be described with reference to the flowchart of FIG. 4.

In step S401, a model acquisition unit 301 acquires a learned model obtained by performing learning of noise removal processing. For the learned model, for example, an architecture described in FastDVDnet: Towards Real-Time Deep Video Denoising Without Flow Estimation can be used. A weight parameter included in the network parameters of the learned model is obtained by learning using the updating method indicated by equation (4). Note that the learned model acquisition method by the model acquisition unit 301 is not limited to a specific acquisition method. For example, the model acquisition unit 301 may acquire a learned model stored in the external storage device 30 in advance from the edge device 100 via the Internet. The model acquisition unit 301 then transmits the acquired learned model to the edge device 100.

In step S402, the acquisition unit 302 acquires a RAW image by image capturing, and applies development processing to the acquired RAW image, thereby generating an input image. The developing method in the development processing can be selected by, for example, the user operating a user interface such as a button provided on the image capturing apparatus 10. In this case, the acquisition unit 302 applies development processing of the developing method selected by the user to the RAW image, thereby generating an input image. Note that the developing method selection method is not limited to a specific selection method. For example, the image capturing apparatus 10 may automatically select the developing method based on the average luminance or texture amount of a scene. The color space before development (that is, the color space of the RAW image) will be referred to as a first color space, and the color space after development (that is, the color space of the input image) will be referred to as a second color space hereinafter.

Note that some neural networks improve performance by employing the image in the first color space as the input. Hence, depending on the processing of the neural network to be performed by a forward propagation unit 307, the image in the first color space may be transmitted as the input image to the edge device 100.

In this embodiment, the acquisition unit 302 transmits, to the edge device 100, the RAW image obtained by image capturing and the input image generated by applying development processing to the RAW image.

In step S403, a color space determination unit 303 receives the RAW image and the input image transmitted from the image capturing apparatus 10. Defining a pixel value in the RAW image as an input pixel value and a pixel value in the input image as an output pixel value, the color space determination unit 303 then judges whether the relationship between the input pixel value and the output pixel value (the relationship between the pixel value before development processing and the pixel value after development processing) is close to the line 510 or the curve 508/509 in FIG. 5.

Upon judging that the relationship between the pixel value in the RAW image and the pixel value in the input image is closer to the line 510 than the curve 508 (or the curve 509) (that is, upon judging that nonlinear pixel value conversion is not performed in the development processing of the RAW image), the color space determination unit 303 judges that the color space of the input image is the first color space.

On the other hand, upon judging that the relationship between the pixel value in the RAW image and the pixel value in the input image is closer to the curve 508 (or the curve 509) than the line 510 (that is, upon judging that nonlinear pixel value conversion is performed in the development processing of the RAW image), the color space determination unit 303 judges that the color space of the input image is the second color space.

Note that not the relationship of pixel values but a relationship concerning another element such as the relationship of textures or channel counts may be used. The color space of the input image may be determined based on the developing method selected by the user operating the image capturing apparatus. The method of judging whether nonlinear pixel value conversion is performed in the development processing of the RAW image is not limited to a specific method.

In step S404, if it is judged that the color space of the input image is the second color space, an acquisition unit 304 acquires development parameters corresponding to the developing method by the acquisition unit 302. The development parameters are parameters that determine the contents of processing to be applied in the used developing method, such as a gamma curve, an OB value, a WB coefficient, a color matrix, a color filter array, and a gain value.

In this embodiment, the edge device 100 holds, for each developing method, representative development parameters in the developing method. The acquisition unit 304 acquires, from a table, the development parameters corresponding to the developing method selected for development processing by the acquisition unit 302. Note that the method of acquiring the development parameters corresponding to the developing method selected for development processing for generating the input image is not limited to a specific acquisition method. For example, the development parameters may be estimated based on a statistic such as the luminance distribution or local variance of the input image.

Note that if it is judged that the color space of the input image is the first color space, the acquisition unit 304 does not perform the development parameter acquisition processing.

In step S405, if it is judged that the color space of the input image is the second color space (the color space after development), a color space conversion unit 305 applies inverse development processing using the development parameters acquired in step S404 to the input image, thereby generating a conversion result image. Inverse development processing to the input image is processing of applying inverse conversion of development processing to the input image based on the development parameters. An equation for obtaining an input image (developed image) y from a RAW image x is equation (5). For this reason, to perform color space conversion for obtaining a RAW image x^ that is an inverse development result (conversion result image) from the input image (developed image) y, the color space conversion unit 305 calculates equation (6).

$$y = M\gamma(D(Wgx) - d) \tag{5}$$

-continued $$\hat{x} = \frac{1}{g} W^{-1} D^{-1}\left(\gamma^{-1}\left(M^{-1} y\right) + d\right) \tag{6}$$

Here, a coefficient d is an OB value, a matrix W is a WB coefficient, a coefficient g is a gain value, and a matrix M is a color matrix. A function γ( ) indicates table lookup for performing luminance conversion according to a gamma curve, and an inverse function $\gamma^{1}(\ )$ indicates inverse lookup of the table. A function D( ) is a function of interpolation processing for converting a color filter array image of 1 channel into an RGB image of 3 channels, and an inverse function $D^{-1}(\ )$ is a function of color thinning processing for converting an RGB image into a color filter array image. In the information of a channel added by development processing, the noise intensity is indeterminate due to interpolation processing. For this reason, if the noise intensity is estimated by referring to this value, the error becomes large. Hence, when the information of the added channel is excluded from the target of noise intensity estimation in accordance with the information of the color filter array, the error in noise intensity estimation at the subsequent stage can be reduced.

The color space conversion unit 305 outputs the generated conversion result image to an estimation unit 306. Note that if it is judged that the color space of the input image is the first color space, the color space conversion unit 305 outputs the input image (the result of identity transformation of the input image) as the conversion result image to the estimation unit 306.

In step S406, the estimation unit 306 estimates the noise intensity in the conversion result image. For example, for each local region in the conversion result image, the estimation unit 306 obtains the variation of pixel values in the local region. For example, the estimation unit 306 obtains the standard deviation of the pixel values of pixels in a tap that is a local region having a size of r (r is an integer of 2 or more) pixels×r pixels with respect to the pixel at a pixel position (i,j) in the conversion result image as the center. The estimation unit 306 performs this processing for each pixel position in the conversion result image. At this time, flat portion determination is performed to specify a flat portion in which an image texture is absent and the standard deviation can be measured satisfactorily. In addition, determination based on the pixel values is performed to specify a highlight detail loss portion/shadow detail loss portion in which the pixel values are saturated and standard deviation measurement readily fails. To remove outliers in the standard deviations obtained for all local regions (for the pixel positions in the conversion result image) of the flat portions that are not the highlight detail loss portions/shadow detail loss portions, the estimation unit 306 obtains the standard deviation that is the median of the standard deviations obtained for all local regions as the noise intensity in the conversion result image.

Note that the method of estimating the noise intensity in the conversion result image is not limited to a specific method. For example, the estimation unit 306 may measure the standard deviation by referring to the pixel values in images at the preceding and subsequent times, or may perform processing for improving robustness, for example, defining a portion where the standard deviation is larger than the periphery as a non-flat region and excluding it from measurement. In addition, the variation of pixel values may be measured not by standard deviation calculation but by another method such as application of a filter or frequency analysis.

Thus, regardless of whether the color space of the input image is the first color space or the second color space, overestimation or underestimation of the noise intensity can be suppressed, and the image in the color space suitable for improving performance of the neural network at the subsequent stage can be transferred.

In step S407, the forward propagation unit 307 applies noise removal processing to the conversion result image. For example, if the noise intensity estimated in step S406 is equal to or larger than a threshold, the forward propagation unit 307 inputs the conversion result image to the learned model received from the cloud server 200, performs an operation (forward propagation processing) of the learned model, generates an image that has undergone the noise removal processing as the output of the learned model, and outputs the generated image as the output image. On the other hand, if the noise intensity estimated in step S406 is smaller than the threshold, the forward propagation unit 307 outputs the conversion result image as the output image.

Note that execution control of the noise removal processing according to the noise intensity is not limited to the above-described execution control. For example, the forward propagation unit 307 may perform noise removal processing using a method according to the noise intensity. For example, in accordance with the noise intensity, the forward propagation unit 307 may select one of four candidates, that is, "noise removal processing using a learned model having high image quality improvement performance but a high calculation cost" (first candidate), "noise removal processing using a learned model having a low calculation cost but low image quality improvement performance" (second candidate), "noise removal processing of rule base of a lower calculation cost" (third candidate), and "nonexecution of noise removal" (fourth candidate). For example, the forward propagation unit 307 may select the first candidate if the noise intensity is equal to or larger than the first threshold, select the second candidate if the noise intensity is equal to or larger than the second threshold and smaller than the first threshold, select the third candidate if the noise intensity is equal to or larger than the third threshold and smaller than the second threshold, or select the fourth candidate if the noise intensity is smaller than the third threshold. If one of the first to third candidates is selected, the forward propagation unit 307 performs noise removal processing of the selected candidate. If the fourth candidate is selected, noise removal processing is not performed.

Note that in the noise removal processing, a method using a neural network need not always be included. A noise removal model to which the noise intensity can externally be input as an argument may be employed, and the noise intensity may be given to the argument. In this case, if the noise intensity given to the argument is higher, the noise removal model performs noise removal processing using network parameters with higher image quality improvement performance.

As described above, in this embodiment, a case where the estimated noise intensity is applied to noise removal processing has been described. However, the application target of the estimated noise intensity is not limited to noise removal processing. For example, the noise intensity may be applied another image quality improvement processing such as super resolution processing or blur removal, or image analysis processing such as object recognition or object detection. At this time, a model or method to be applied is switched in accordance with the noise intensity.

In step S407*a*, the forward propagation unit 307 judges whether to perform learning of the CNN. A judgement criterion used to judge whether to perform learning of the CNN is not limited to a specific judgment criterion. For example, if at least one of the conditions that an error to be described later is equal to or larger than a threshold, the difference between the preceding error and the current error is equal to or larger than a threshold, the learning count is less than a threshold, and the time elapsed from the start of learning is less than a threshold is satisfied, the forward propagation unit 307 judges to perform learning of the CNN. Also, for example, if a setting is done in advance to perform learning of the CNN, the forward propagation unit 307 judges to perform learning of the CNN, and if a setting is done in advance not to perform learning of the CNN, the forward propagation unit 307 judges not to perform learning of the CNN.

Figure 4:
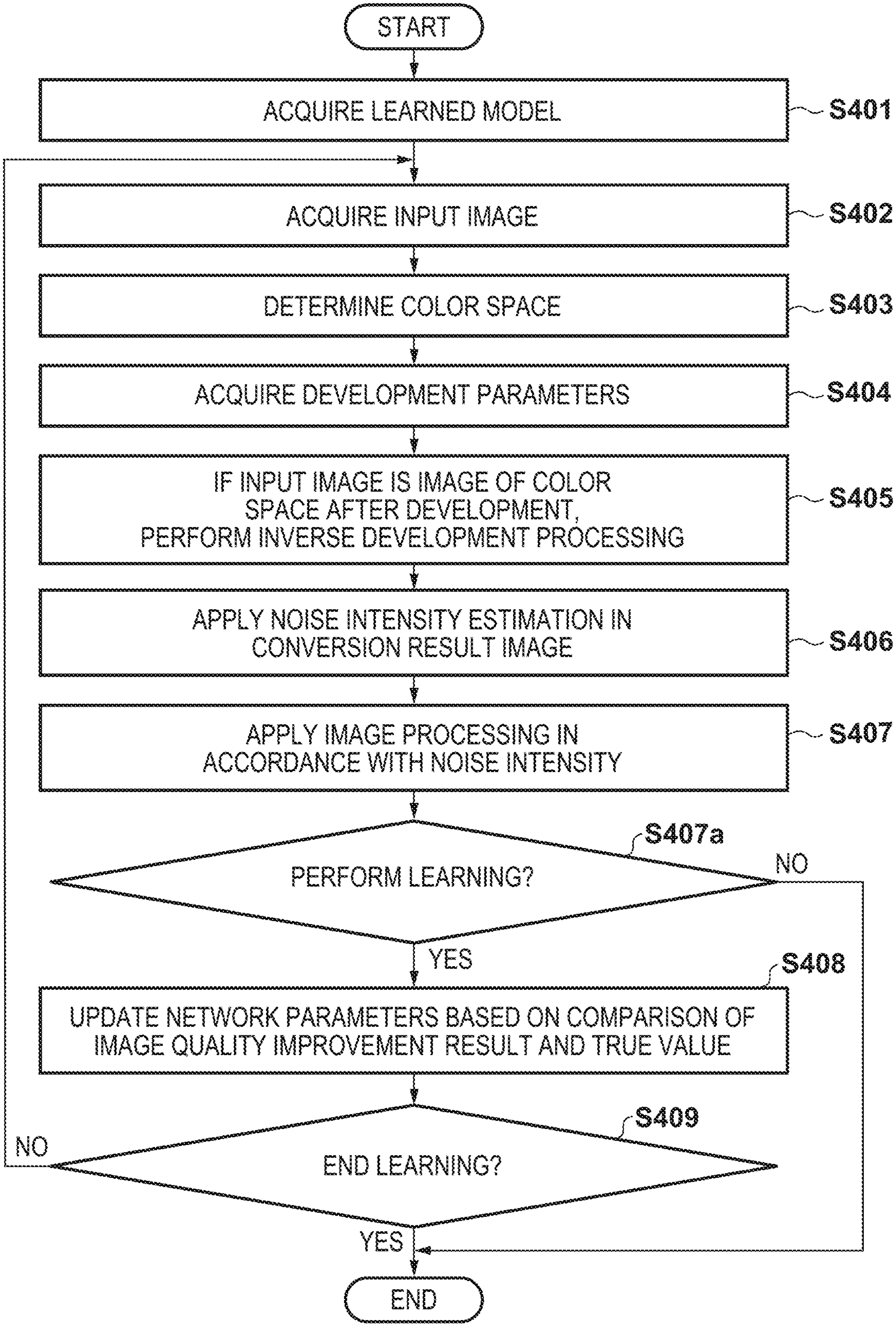
FIG. 4 is a flowchart showing the operation of the image processing system.

As the result of judgment, upon judging to perform learning of the CNN, the process advances to step S408. Upon judging not to perform learning of the CNN, the processing according to the flowchart of FIG. 4 is ended.

In step S408, an updating unit 308 obtains the error between the output image (image quality improvement result) output from the forward propagation unit 307 and correct answer data (true value) corresponding to the output image. The updating unit 308 updates the network parameters of the learned model in accordance with equation (4) to make the error small, thereby performing learning processing of the learned model.

In step S409, the updating unit 308 judges whether the end condition of learning of the CNN is satisfied. The end condition of learning of the CNN is not limited to a specific end condition. As the end condition of learning of the CNN, for example, one or more of the conditions that "the error is less than a threshold", "the difference between the preceding error and the current error is less than a threshold", "the learning count is equal to or larger than a threshold", and "the time elapsed from the start of learning is equal to or larger than a threshold" can be applied.

As a result of this judgment, upon judging that the end condition of learning of the CNN is not satisfied, the process returns to step S402. Upon judging that the end condition of learning of the CNN is satisfied, the processing according to the flowchart of FIG. 4 is ended. The output image that is the result of forward propagation processing is output as the final result of noise removal processing.

Note that the output destination of the output image is not limited to a specific output destination. For example, the forward propagation unit 307 may display the output image on the display device 40, or may store the output image in a memory device such as the mass storage device 104 or the external storage device 30. Also, for example, the forward propagation unit 307 may transmit the output image to another apparatus such as the cloud server 200 via the network I/F 106.

As described above, according to this embodiment, the input image in the second color space received by the edge device is converted into the image in the first color space that substantially matches the color space before development. In other words, conversion for implementing a state in which "pixel values at the same coordinates substantially match between the RAW image and the conversion result image in the first color space obtained by converting the RAW image" is performed. Overestimation or underestimation of the noise intensity can be suppressed by applying noise intensity estimation to the conversion result image.

Note that in this embodiment, an example in which the conversion result image in the same color space as the RAW image is obtained has been described. However, the color space of the conversion result image is not limited to this, and a color space independent of the developing method suffices. For example, when performing inverse development processing according to equation (6), if it is known in advance that only gamma conversion γ( ) greatly changes between the developing methods, only inverse gamma conversion $\gamma^{1}$( ) may be performed in the inverse development processing. With this processing, the color space after the inverse gamma conversion is the color space independent of the developing method and enables calculation of the noise intensity. In other words, it is necessary only to calculate the noise intensity in the color space in which "pixel values at the same coordinates substantially match between the conversion result image obtained in this embodiment and the image obtained by performing color space conversion after the RAW image that is the base of the conversion result image is developed by another developing method". By permitting this conversion, the calculation of equation (6) can be simplified, and the operation cost can be reduced.

Also, in this embodiment, an example in which color space conversion by inverse development processing is performed has been described. The image obtained as the result of inverse development processing is readily an image with a low luminance and a low chroma, and visibility is low. The edge device 100 may estimate the noise intensity in a color space obtained by performing given color conversion for the result of inverse development processing. For example, the edge device 100 may convert the conversion result image that is the result of inverse development processing into an image in the L*a*b* color space using a uniform conversion coefficient, and estimate the noise intensity in the image. Since this can improve the visibility of the image while maintaining the advantage that noise intensity estimation independent of the developing method can be performed, the result of estimation of the noise intensity can easily be interpreted by a human.

Second Embodiment

In this embodiment, differences from the first embodiment will be described, and the rest is assumed to be the same as in the first embodiment unless it is specifically stated otherwise below. In the first embodiment, a mode in which the edge device 100 applies color space conversion to the input image to enable noise intensity estimation independent of the developing method has been described. However, if the size of the input image is large, the calculation cost of color space conversion in the edge device 100 increases in proportion to the size. In this embodiment, an image capturing apparatus 10 applies noise intensity estimation to a RAW image and transmits the result of the noise intensity estimation to an edge device 100, thereby reducing the calculation cost of color space conversion in the edge device 100.

Figure 6:
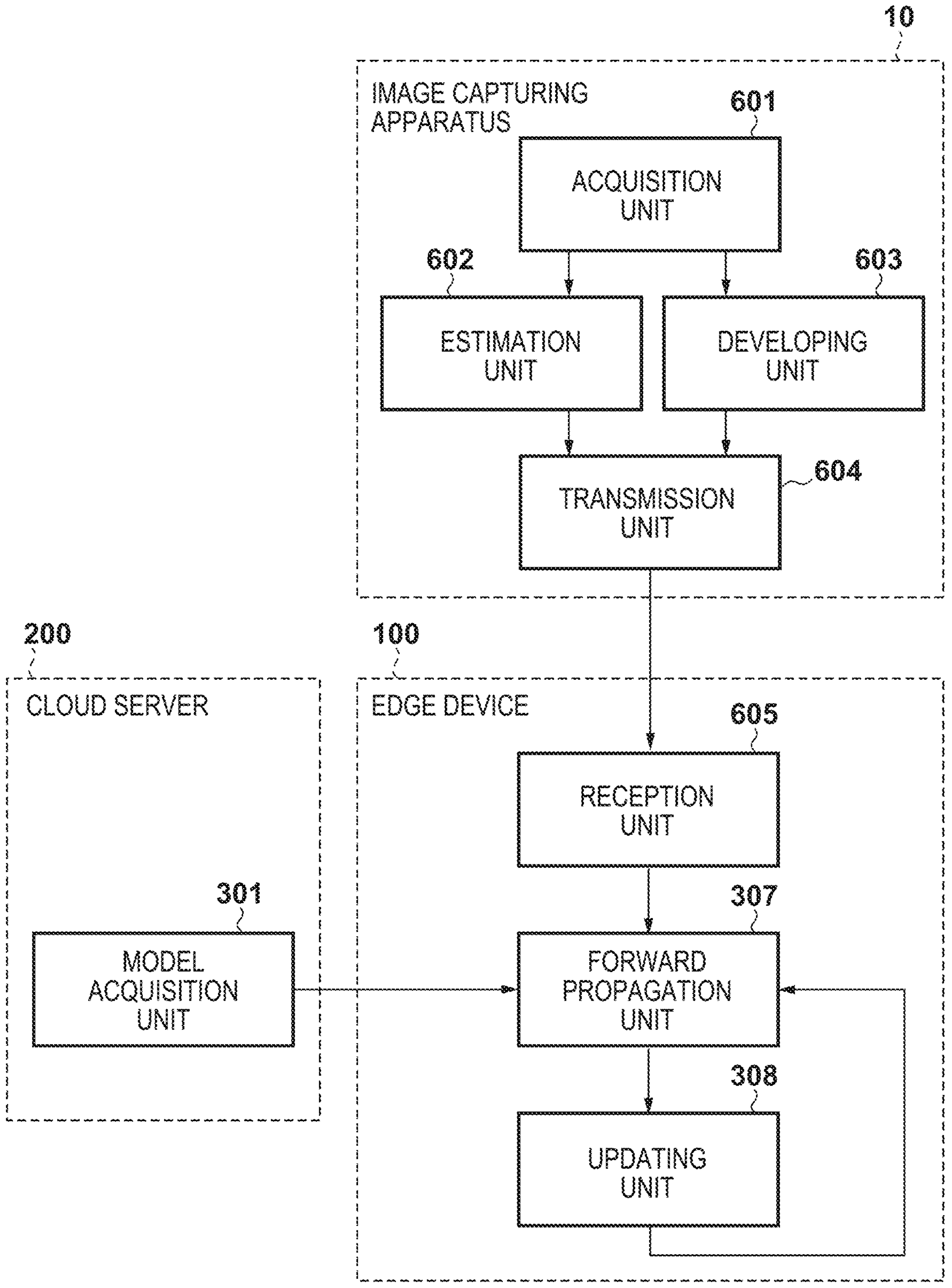
FIG. 6 is a block diagram showing an example of the functional configuration of the image processing system.

The block diagram of FIG. 6 shows an example of the functional configuration of an image processing system according to this embodiment. The same reference numerals as in FIG. 3 denote the same function units in FIG. 6, and a description of the function units will be omitted.

Figure 7:
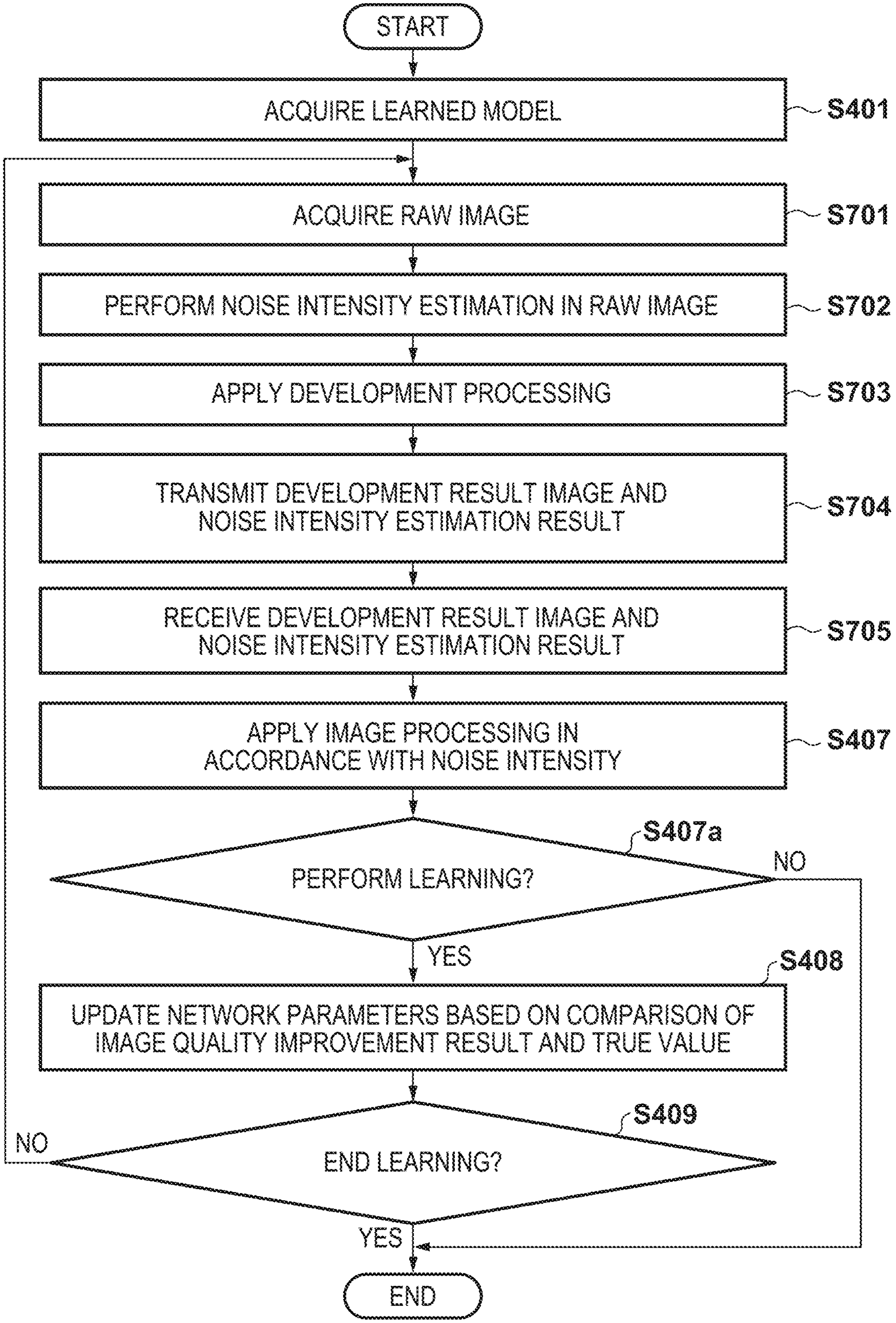
FIG. 7 is a flowchart showing the operation of the image processing system.

The operation of the image processing system according to this embodiment will be described with reference to the flowchart of FIG. 7. Note that the same step numbers as in FIG. 4 denote the same processing steps in FIG. 7, and a description of the processing steps will be omitted.

In step S701, an acquisition unit 601 acquires a RAW image, like step S402. In step S702, an estimation unit 602 estimates a noise intensity in the RAW image acquired in step S701 by the same processing as in step S406.

In step S703, a developing unit 603 applies development processing to the RAW image acquired in step S701, like step S402, thereby generating a development result image.

In step S704, a transmission unit 604 transmits the development result image generated in step S703 and the noise intensity (noise intensity estimation result) estimated in step S702 to the edge device 100.

In step S705, a reception unit 605 receives the development result image and the noise intensity transmitted from the image capturing apparatus 10. Note that in step S407, a forward propagation unit 307 handles the development result image as a conversion result image and applies noise removal processing to the conversion result image, as in the first embodiment. The noise intensity referred to at this time is the noise intensity received in step S705.

As described above, according to this embodiment, as compared to the first embodiment, since the necessity of inverse development processing is obviated, the calculation cost can be reduced in the entire image processing system. Note that image processing executed in the edge device 100 is not limited to noise removal processing, and arbitrary image processing such as image quality improvement processing, recognition processing, object detection, or region segmentation may be executed.

Third Embodiment

Figure 10:
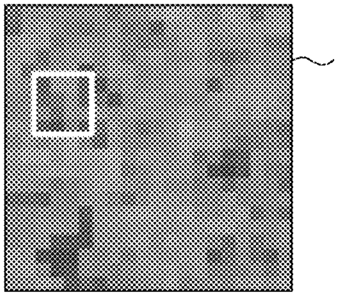
FIG. 10 is a view for explaining the relationship between a noise intensity and an image processing intensity.
Figure 10:
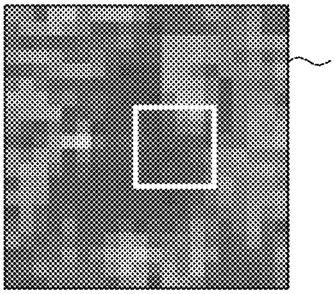
Figure 10:
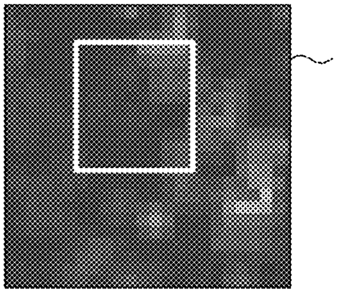

In this embodiment, differences from the first embodiment will be described, and the rest is assumed to be the same as in the first embodiment unless it is specifically stated otherwise below. In the first embodiment, a mode in which the estimation unit 306 performs variation calculation for the image that has undergone development processing of the color space conversion unit 305 has been described. In development processing, however, image processing with a high frequency component reducing effect, such as noise removal, demosaicing, or flaw pixel removal, is generally applied, and a noise component can be smoothened in the spatial direction. Hence, noise generated in a single pixel spreads across a plurality of pixels, and calculation necessary for calculating the variation of pixel values may be complex. For example, as indicated by an image 1001 shown in FIG. 10, if the noise intensity is low, the intensity of image processing to be applied can be low. Hence, the high frequency component of noise is reserved, and a tap size (the size of the rectangle of a white frame) necessary for covering the grains of noise is small. Conversely, as indicated by an image 1003, if the noise intensity is high, image processing with a high intensity needs to be applied. Hence, the high frequency component is reduced, and a larger tap size (the size of the rectangle of a white frame) is needed to cover the grains of noise. As indicated by an image 1002, if the noise intensity is medium, the tap size necessary for covering the grains of noise is an intermediate tap size (the size of the rectangle of a white frame) between the above-described two tap sizes.

The larger the tap size is, the higher the operation cost necessary for calculating the variation is. Such a calculation cost of noise intensity estimation is called calculation complexity. Without considering this characteristic, the error of noise intensity estimation may be expanded, or the calculation cost increases.

If the noise intensity is high, the above-described image processing in development processing is often applied at a high intensity to suppress it. Hence, even if the image processing intensity is unknown, it can be estimated based on the noise intensity.

In this embodiment, a procedure of obtaining an image processing intensity based on a noise intensity and a procedure of obtaining a noise intensity with calculation complexity derived from it are alternately performed, thereby performing estimation while sequentially detailing the two pieces of information. This can implement a small estimation error while suppressing the calculation amount of noise intensity estimation.

Figure 8:
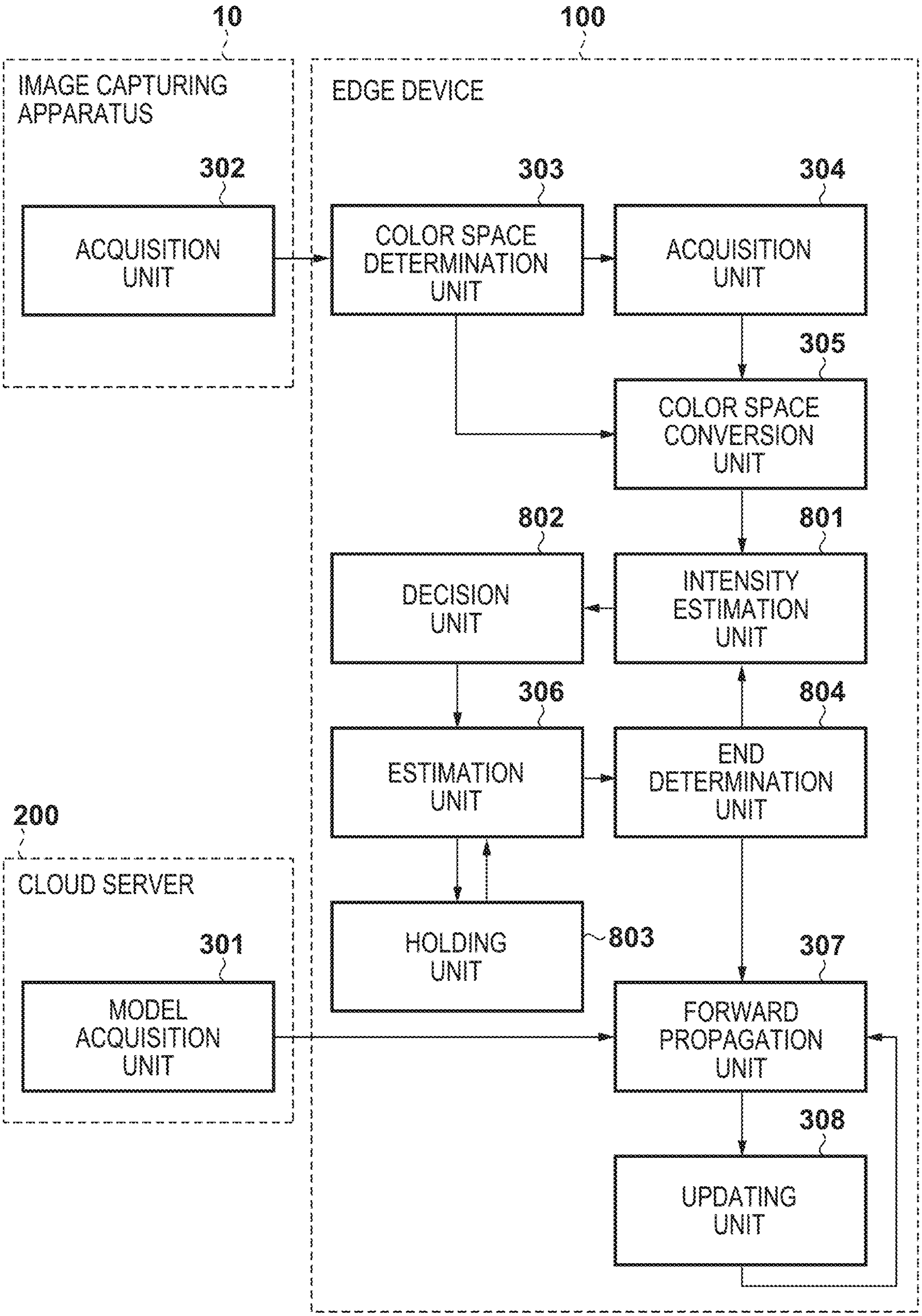
FIG. 8 is a functional block diagram of an entire image processing system according to the third embodiment.

The block diagram of FIG. 8 shows an example of the functional configuration of an image processing system according to this embodiment. The same reference numerals as in FIG. 3 denote the same function units in FIG. 8, and a description of the function units will be omitted.

Figure 9A:
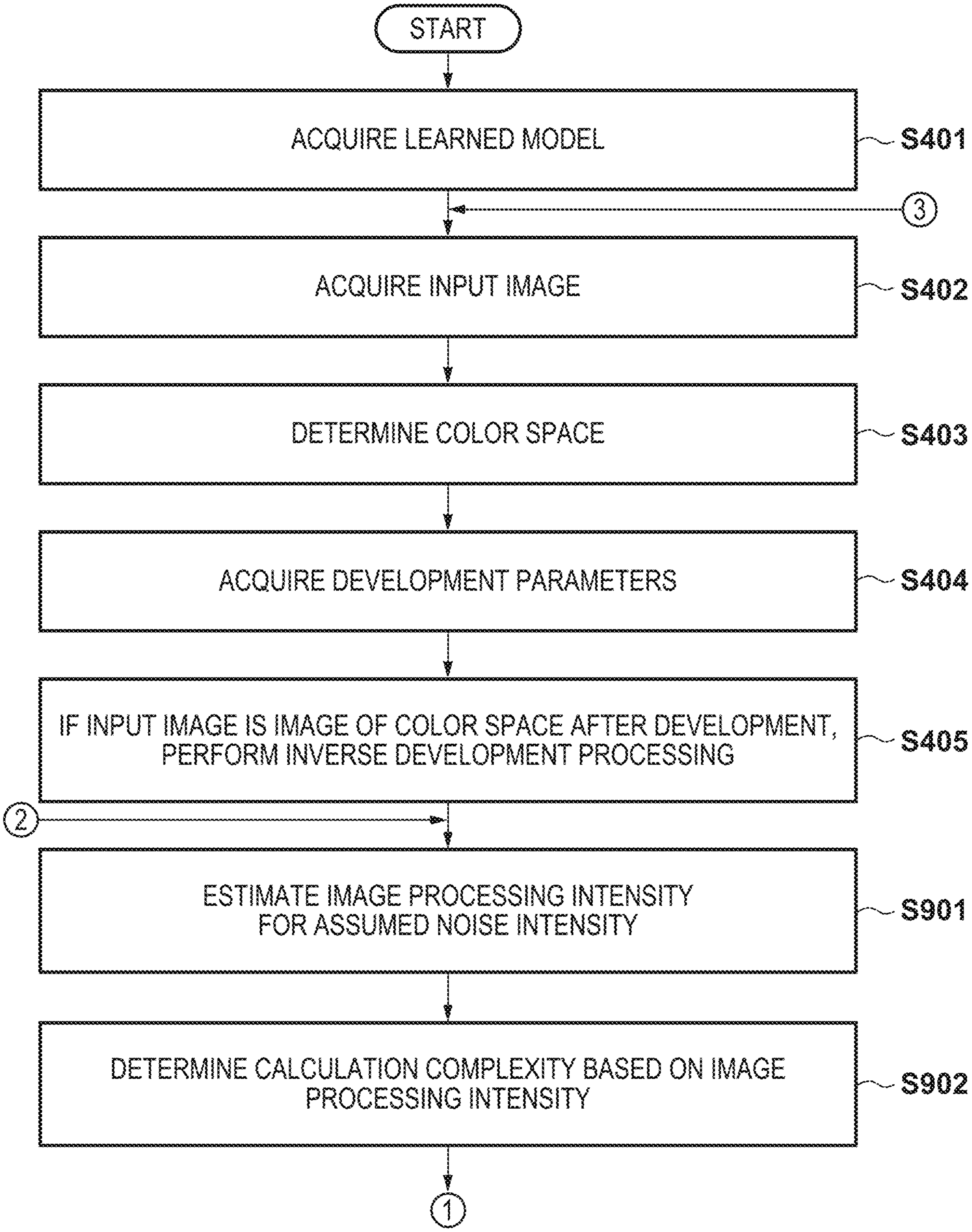
FIG. 9A is a flowchart showing the procedure of processing in the image processing system according to the third embodiment.
Figure 9B:
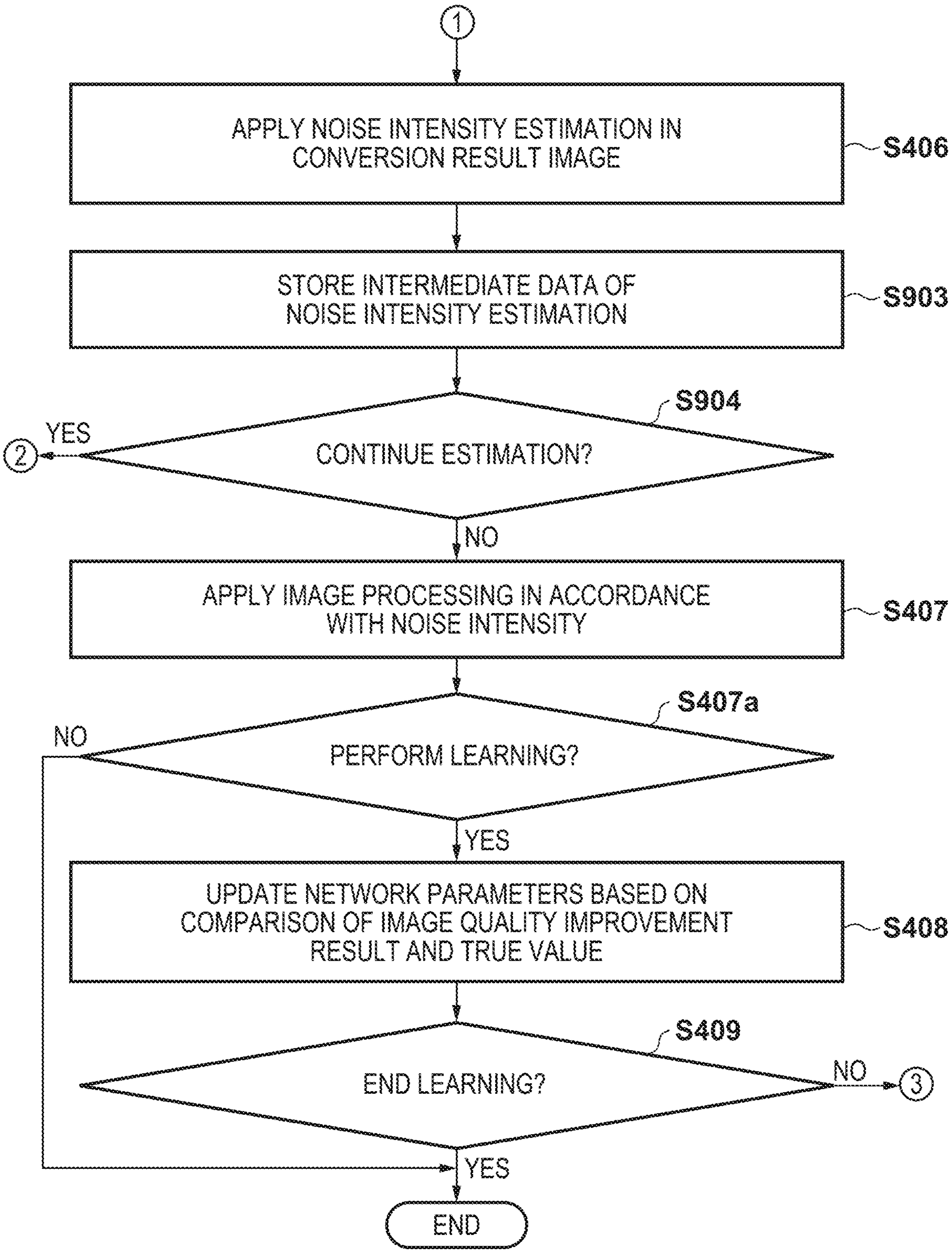
FIG. 9B is a flowchart showing the procedure of processing in the image processing system according to the third embodiment.

The operation of the image processing system according to this embodiment will be described with reference to the flowcharts of FIGS. 9A and 9B. Note that the same step numbers as in FIG. 4 denote the same processing steps in FIGS. 9A and 9B, and a description of the processing steps will be omitted.

In step S901, an intensity estimation unit 801 receives an estimated value of a given noise intensity. The noise intensity is represented by a standard deviation, and the initial values of a maximum value σmax and a minimum value σmin of the standard deviation estimation are received. A unit impulse response when applying development processing in the standard deviation is obtained in advance, and the spread pixel count of the impulse is stored in a table. Values corresponding to (σmin, σmax) are extracted from the table, thereby obtaining the image processing intensity. Here, as an example, assume that when the initial values (σmin, σmax)=(15, 70), values (4, 32) are obtained as the minimum/maximum values of the corresponding pixel count.

In step S902, a decision unit 802 obtains a tap size r from the image processing intensity. Assuming that the spread of the impulse is minimum, the tap size is a size covering this. In the above example, r=4. Note that the obtaining method is not limited to the above-described method and, for example, an average size or a maximum size may be obtained. Also, the calculation complexity is not limited to the tap size and, for example, a sample size extracted from the image at the time of variation measurement, or a channel count/frame count used in variation measurement may be used.

In step S406, an estimation unit 306 performs standard deviation measurement with the determined calculation complexity, and estimates the noise intensity. The noise intensity is obtained as the standard deviation of pixel values in the tap, as in the first embodiment. The standard deviation is obtained in a given p % confidence interval. For example, assume that when p=95, an interval of (σmin, σmax)=(40, 70) is obtained.

The intensity estimation unit 801 obtains the image processing intensity again using the updated (σmin, σmax). For example, if values (8, 32) are obtained, these are output to the decision unit 802, and the calculation complexity is updated. The noise intensity is estimated based on these values and, for example, a section (σmin, σmax)=(40, 55) is obtained. In this way, loop processing for sequentially detailing the image processing intensity and the noise intensity is performed.

In step S903, a holding unit 803 holds intermediate output data of noise intensity estimation. The intermediate output data is the result of determining a highlight detail loss portion/shadow detail loss portion/flat portion. The intermediate output data is loaded in noise intensity estimation of the next time and used to calculate the standard deviation of a flat portion that is not a highlight detail loss portion or shadow detail loss portion. Note that information other than the above-described information may be used as the intermediate output data. For example, the information of the variation of pixel values may be stored as the intermediate output data, and the standard deviation may be measured based on the value in noise intensity estimation of the next time.

In step S904, an end determination unit 804 determines whether to end the loop processing. If a value (σmax−σmin) is smaller than a given threshold, it is considered that the possible width of the noise intensity is sufficiently converged, and it is judged to end the loop. On the other hand, if the value (σmax−σmin) is equal to or larger than the given threshold, it is not considered that the possible width of the noise intensity is sufficiently converged, and the process returns to step S901. The end determination unit 804 outputs an average value (σmin+σmax)/2 as the final noise intensity to a forward propagation unit 307.

Note that in this embodiment, an example of loop processing of sequentially reducing the width of the maximum and minimum values of the noise intensity has been described. However, the method of obtaining the noise intensity is not limited to this. For example, the expected value and the variance of the noise intensity may be obtained, and the variance may be reduced while updating the expected value in each loop.

Also, in this embodiment, an example in which noise intensity estimation and image processing intensity estimation are performed using the image after inverse development as an input has been described. However, the form of the input image is not limited to this, and another form such as a general developed image or an image obtained by converting a RAW image is also possible.

As described above, in this embodiment, processing of sequentially detailing the image processing intensity and the estimated value of the noise intensity is performed. Accordingly, even in an image to which such image processing that makes noise generated in a single pixel spread across a plurality of pixels is applied, a small estimated error can be implemented while suppressing the calculation amount of noise intensity estimation.

The numerical values, the processing timings, the processing order, the main constituent of processing, and the data (information) acquisition method/transmission destination/transmission source/storage location used in the above-described embodiments are merely examples used to make a detailed description, and it is not intended to limit to these examples.

Some or all of the above-described embodiments may appropriately be combined and used. Also, some or all of the above-described embodiments may selectively be used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-136528, filed Aug. 24, 2023, and Japanese Patent Application No. 2024-038415, filed Mar. 12, 2024, which are hereby incorporated by reference herein in their entirety.

What is claimed is:

1. An image processing apparatus comprising:

(a) one or more circuits and/or (b) a memory and one or more processors, configured to function as plurality of units comprising:

(1) an acquisition unit configured to acquire a first image generated by applying development processing to a RAW image; and (2) an estimation unit configured to convert the first image into a second image that is an image in a color space independent of a developing method and to estimate a noise intensity based on in the second image, wherein the estimation unit outputs, as a final noise intensity in the second image, a noise intensity in the second image obtained by repeatedly performing:

(i) estimating an image processing intensity based on an estimated noise intensity in the second image, (ii) deciding a calculation complexity, which is a calculation cost of noise intensity estimation, based on the image processing intensity, and (iii) estimating the noise intensity in the second image based on the calculation complexity.

2. The apparatus according to claim 1, wherein the acquisition unit acquires the first image generated by applying the development processing to the RAW image in an image capturing apparatus.

3. The apparatus according to claim 1, wherein the estimation unit acquires a parameter of the development processing and applies inverse conversion of the development processing to the first image using the parameter, thereby generating the second image.

4. The apparatus according to claim 1, wherein the estimation unit acquires a parameter of the development processing, applies inverse conversion of the development processing to the first image using the parameter, and converts the color space, thereby generating the second image.

5. The apparatus according to claim 3, wherein the estimation unit acquires a parameter corresponding to the developing method of the development processing.

6. The apparatus according to claim 3, wherein the parameter includes at least one of a gamma curve, an OB value, a WB coefficient, a color matrix, a color filter array, and a gain value in the development processing.

7. The apparatus according to claim 1, wherein the estimation unit:

(1) judges whether nonlinear pixel value conversion is performed in the development processing, (2) if the nonlinear pixel value conversion is performed in the development processing, converts the first image into the second image and estimates the noise intensity based on the second image, and (3) if the nonlinear pixel value conversion is not performed in the development processing, estimates the noise intensity based on the first image.

8. The apparatus according to claim 1, wherein the plurality of units further comprises a control unit configured to perform execution control of image processing in accordance with the noise intensity estimated by the estimation unit.

9. The apparatus according to claim 8, wherein if the noise intensity is not less than a threshold, the control unit executes the image processing, and wherein if the noise intensity is less than the threshold, the control unit does not execute the image processing.

10. The apparatus according to claim 8, wherein the control unit performs image processing using a method according to the noise intensity.

11. The apparatus according to claim 8, wherein the plurality of units further comprises a learning unit configured to perform, based on a result of the image processing, learning of a model that performs the image processing.

12. The apparatus according to claim 1, wherein the calculation complexity includes one of:

(1) a tap size used for estimating the noise intensity in the second image, (2) a channel count used for estimating the noise intensity in the second image, and (3) a frame count used for estimating the noise intensity in the second image.

13. The apparatus according to claim 1, wherein the plurality of units further comprises a unit configured to determine an end of performing of (i), (ii), and (iii) based on the noise intensity estimated in (iii).

14. The apparatus according to claim 1, wherein the plurality of units further comprises a unit configured to hold intermediate output data of estimation of a noise amount, and wherein the estimation unit estimates the noise amount based on the intermediate output data.

15. The apparatus according to claim 14, wherein in the estimation of the noise amount, the intermediate output data, concerning at least one region, including a variation of pixel values or information representing an enable/disable state of use to estimation of the noise amount is output.

16. An image processing method performed by an image processing apparatus, the method comprising:

acquiring a first image generated by applying development processing to a RAW image;

converting the first image into a second image that is an image in a color space independent of a developing method; and estimating a noise intensity in the second image, wherein the estimating outputs, as a final noise intensity in the second image, a noise intensity in the second image obtained by repeatedly performing:

(i) estimating an image processing intensity based on an estimated noise intensity in the second image, (ii) deciding a calculation complexity, which is a calculation cost of noise intensity estimation, based on the image processing intensity, and (iii) estimating the noise intensity in the second image based on the calculation complexity.

17. A non-transitory computer-readable storage medium storing a computer program configured to cause a computer to function as a plurality of units comprising:

an acquisition unit configured to acquire a first image generated by applying development processing to a RAW image; and an estimation unit configured to convert the first image into a second image that is an image in a color space independent of a developing method and to estimate a noise intensity in the second image, wherein the estimation unit outputs, as a final noise intensity in the second image, a noise intensity in the second image obtained by repeatedly performing:

(i) estimating an image processing intensity based on an estimated noise intensity in the second image, (ii) deciding a calculation complexity, which is a calculation cost of noise intensity estimation, based on the image processing intensity, and (iii) estimating the noise intensity in the second image based on the calculation complexity.

* * * * *